US010650528B2

United States Patent
Maity et al.

(10) Patent No.: US 10,650,528 B2
(45) Date of Patent: May 12, 2020

(54) SYSTEMS AND METHODS FOR EDGE POINTS BASED MONOCULAR VISUAL SLAM

(71) Applicant: Tata Consultancy Services Limited, Mumbai (IN)

(72) Inventors: Soumyadip Maity, Kolkata (IN); Arindam Saha, Kolkata (IN); Brojeshwar Bhowmick, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 254 days.

(21) Appl. No.: 15/913,800

(22) Filed: Mar. 6, 2018

(65) Prior Publication Data
US 2019/0114777 A1    Apr. 18, 2019

(30) Foreign Application Priority Data

Oct. 18, 2017  (IN) .............................. 201721037059

(51) Int. Cl.
*G06T 7/13* (2017.01)
*G06T 5/00* (2006.01)
(Continued)

(52) U.S. Cl.
CPC ............ *G06T 7/13* (2017.01); *G06K 9/00201* (2013.01); *G06T 5/002* (2013.01); *G06T 7/579* (2017.01);
(Continued)

(58) Field of Classification Search
CPC .......... G06T 7/13; G06T 7/579; G06T 5/002; G06T 15/205; G06T 7/73; G06T 2207/30241; G06K 9/00201
See application file for complete search history.

(56) References Cited

U.S. PATENT DOCUMENTS 8,532,367 B2 * 9/2013 Kaganovich ............ G06T 7/579
345/169
9,304,003 B1 * 4/2016 Ashman ............... G01C 21/206
(Continued)

FOREIGN PATENT DOCUMENTS

CN      106570913 A     4/2017

OTHER PUBLICATIONS

Eade, E., et al., "Edge landmarks in monocular SLAM," Image and Vision Computing, vol. 27, pp. 588-596, 2009 (Year: 2009).*
(Continued)

*Primary Examiner* — Xuemei G Chen
(74) *Attorney, Agent, or Firm* — Finnegan, Henderson, Farabow, Garrett & Dunner LLP

(57) ABSTRACT

Feature based visual simultaneous localization and mapping (SLAM) do not produce reliable camera and structure estimates due to insufficient features in a low-textured environment. Moreover, existing visual SLAMs produce partial reconstruction when the number of 3D-2D correspondences is insufficient for incremental camera estimation using bundle adjustment. Systems and methods of the present disclosure provide edge points based monocular visual SLAM that mitigates these problems. The SLAM is initialized through a validation process. A local optimization process is provided for stable pose estimation in situations where camera tracking becomes unreliable in a very low-textured challenging environment. An efficient and reliable loop closing process that uses structural properties of edges in the frames is also provided.

18 Claims, 15 Drawing Sheets

(51) Int. Cl.
*G06T 15/20* (2011.01)
*G06K 9/00* (2006.01)
*G06T 7/73* (2017.01)
*G06T 7/579* (2017.01)

(52) U.S. Cl.
CPC .............. *G06T 7/73* (2017.01); *G06T 15/205* (2013.01); *G06T 2207/30241* (2013.01)

(56) References Cited

U.S. PATENT DOCUMENTS

| | | | | |
|---|---|---|---|---|
| 9,646,384 | B2* | 5/2017 | Lee | G06K 9/00208 |
| 9,704,043 | B2* | 7/2017 | Schnittman | B25J 5/00 |
| 9,996,945 | B1* | 6/2018 | Holzer | G06K 9/00671 |
| 10,210,662 | B2* | 2/2019 | Holzer | G06T 19/006 |
| 2004/0037465 | A1* | 2/2004 | Krause | G06K 9/0063 |
| | | | | 382/199 |
| 2012/0121161 | A1* | 5/2012 | Eade | G09B 29/007 |
| | | | | 382/153 |
| 2014/0010418 | A1* | 1/2014 | Dey | G06F 3/012 |
| | | | | 382/118 |
| 2016/0259993 | A1* | 9/2016 | Ulbricht | H04N 5/247 |
| 2016/0339587 | A1* | 11/2016 | Rublee | B25J 9/1697 |
| 2017/0018088 | A1* | 1/2017 | Jeong | G06T 15/04 |
| 2017/0177937 | A1* | 6/2017 | Harmsen | G06T 7/579 |
| 2017/0193687 | A1* | 7/2017 | Lo | G06T 5/001 |
| 2018/0005015 | A1* | 1/2018 | Hou | G06K 9/4671 |
| 2018/0112985 | A1* | 4/2018 | Madison | G05D 1/027 |
| 2019/0035047 | A1* | 1/2019 | Lim | H04N 5/23212 |
| 2019/0219401 | A1* | 7/2019 | Daniilidis | G06K 9/6277 |
| 2019/0236797 | A1* | 8/2019 | Thyagharajan | G06T 7/85 |
| 2019/0377952 | A1* | 12/2019 | Kim | G06F 16/7837 |
| 2020/0043189 | A1* | 2/2020 | Bao | G06T 7/593 |

OTHER PUBLICATIONS

Jonas Witt, "Visual Localization, Mapping and Reconstruction Using Edges" Jan. 2016, pp. 1-164; Technical University of Hamburg-Harburg.

Ashwin Dani et al. "Image Moments for Higher-Level Feature Based Navigation" Intelligent Robots and Systems (IROS), 2013 IEEE/RSJ International Conference on Nov. 3-7, 2013, IEEE , p. 1-8. Link: http://arcl.ae.illinois.edu/IROS_imagemoment.pdf.

Yousif, K, "3D Simultaneous Localization and Mapping in Texture-less and Structure-less Environments Using Rank Order Statistics" Aug. 2016, p. 1-208, RMIT University Link: https://researchbank.rmit.edu.au/eserv/rmit:161775/Yousif.pdf.

\* cited by examiner

Detected Edges

SYSTEMS AND METHODS FOR EDGE POINTS BASED MONOCULAR VISUAL SLAM

PRIORITY CLAIM

This U.S. patent application claims priority under 35 U.S.C. § 119 to: Indian Patent Application No. 201721037059, filed on 18 Oct. 2017. The entire contents of the aforementioned application are incorporated herein by reference.

TECHNICAL FIELD

The disclosure herein generally relates to simultaneous localization and mapping (SLAM), and particularly to systems and methods for edge points based monocular SLAM.

BACKGROUND

Autonomous navigation of robots requires robust estimation of robot's pose (position, orientation) as well as the associated 3D scene structure. Conventional algorithms and pipelines for visual Simultaneous Localization and Mapping (SLAM) require point correspondences between images or frames for camera (robot) position estimation as well as structure estimation. Feature based methods for visual SLAM try to find the point correspondences between images using scale-invariant feature transform (SIFT), speeded up robust features (SURF) or Oriented FAST and rotated BRIEF (ORB). Visual SLAMs known in the art, use these features to obtain camera and structure estimation by minimizing re-projection error through incremental bundle adjustment; however it fails when the number of points extracted is too less or erroneous especially when the amount of texture present in a scene is inadequate. This may lead to partial reconstruction and stopping of camera tracking when 3D-2D correspondences are less due to insufficient feature correspondences or insufficient 3D points from bundle adjustment. As against this direct SLAMs are independent of the feature extraction; however they are prone to erroneous camera pose estimation due to incorrect photometric error estimation in case of change in lighting or view. Also, direct SLAMs may not provide good camera estimations in the absence of well-textured environment.

SUMMARY

Embodiments of the present disclosure present technological improvements as solutions to one or more of the above-mentioned technical problems recognized by the inventors in conventional systems.

In an aspect, there is provided a processor implemented method comprising acquiring successive frames, in real time, from multiple views captured by a monocular camera located in a SLAM environment and characterized by multiple unknown poses; detecting edges in each of the successive frames; thinning the edges of each of the successive frames to obtain thinned edges having a single pixel width; applying an edge filtering process on the thinned edges to eliminate noise therein; estimating point feature correspondences of edge points constituting the thinned edges by tracking the edge points using an optical flow; identifying a first frame as a keyframe and further identifying a plurality of keyframes, from the acquired successive frames, based on the estimated point feature correspondences and satisfying a first set of constraints; performing a two-view initialization using a selected pair of keyframes from the plurality of keyframes satisfying a second set of constraints to obtain a validated 3D structure; estimating a trajectory of estimated poses from the multiple unknown poses of the monocular camera by obtaining incremental poses based on the validated 3D structure constituting 3D structure points; and rectifying drifts in the estimated trajectory captured in the multiple views using loop closure.

In another aspect, there is provided a system comprising: one or more data storage devices operatively coupled to the one or more processors and configured to store instructions configured for execution by the one or more processors to: acquire successive frames, in real time, from multiple views captured by a monocular camera located in a SLAM environment and characterized by multiple unknown poses; detect edges in each of the successive frames; thin the edges of each of the successive frames to obtain thinned edges having a single pixel width; apply an edge filtering process on the thinned edges to eliminate noise therein; estimate point feature correspondences of edge points constituting the thinned edges by tracking the edge points using an optical flow; identify a first frame as a keyframe and further identifying a plurality of keyframes, from the acquired successive frames, based on the estimated point feature correspondences and satisfying a first set of constraints; perform a two-view initialization using a selected pair of keyframes from the plurality of keyframes satisfying a second set of constraints to obtain a validated 3D structure; estimate a trajectory of estimated poses from the multiple unknown poses of the monocular camera by obtaining incremental poses based on the validated 3D structure constituting 3D structure points; and rectify drifts in the estimated trajectory captured in the multiple views using loop closure.

In yet another aspect, there is provided a computer program product comprising a non-transitory computer readable medium having a computer readable program embodied therein, wherein the computer readable program, when executed on a computing device, causes the computing device to: acquire successive frames, in real time, from multiple views captured by a monocular camera located in a SLAM environment and characterized by multiple unknown poses; detect edges in each of the successive frames; thin the edges of each of the successive frames to obtain thinned edges having a single pixel width; apply an edge filtering process on the thinned edges to eliminate noise therein; estimate point feature correspondences of edge points constituting the thinned edges by tracking the edge points using an optical flow; identify a first frame as a keyframe and further identifying a plurality of keyframes, from the acquired successive frames, based on the estimated point feature correspondences and satisfying a first set of constraints; perform a two-view initialization using a selected pair of keyframes from the plurality of keyframes satisfying a second set of constraints to obtain a validated 3D structure; estimate a trajectory of estimated poses from the multiple unknown poses of the monocular camera by obtaining incremental poses based on the validated 3D structure constituting 3D structure points; and rectify drifts in the estimated trajectory captured in the multiple views using loop closure.

In an embodiment of the present disclosure, the first set of constraints include one or more of: pairwise rotation constraint between a current frame and a last identified keyframe from the acquired successive frames, the pairwise rotation being calculated using epipolar geometry, wherein if the rotation between the current frame and the last identified keyframe is more than 15°, consider a previous frame as a new keyframe; average number of tracked point feature correspondence constraint for each of the successive frames, wherein if number of 2D point feature correspondences between the current frame and the last identified keyframe falls below thirty percent of an average point feature correspondence, consider a previous frame as a new keyframe; number of 3D-2D point feature correspondences constraint, wherein if number of 3D-2D point feature correspondences reduces below 250, consider a next frame as a new keyframe; average positional change of point feature correspondences constraint, wherein if average positional change between the current frame and the last identified keyframe obtained by averaging Euclidean distance between previous and current pixel positions of all point feature correspondences, is more than twenty percent of width of an associated frame, consider the current frame as a new keyframe; and consider a new keyframe in a fixed interval of 1 second.

In an embodiment of the present disclosure, the second set of constraints include one or more of: pairwise rotation between the selected pair of keyframes is more than 15°; averaging Euclidean distance between previous and current pixel positions of all point feature correspondences pertaining to the selected pair of keyframes exceed 20 percent of frame width; and time difference of 1 second between the selected pair of keyframes.

In an embodiment of the present disclosure, the one or more hardware processors are further configured to perform two-view initialization by: iteratively performing: estimating poses for an initial pair of keyframes from the acquired successive frames using a five-point method, wherein the poses correspond to the multiple unknown poses; generating an initial 3D structure comprising a set of 3D structure points by triangulation using the estimated poses; optimizing the initial 3D structure using global bundle adjustment, performed periodically on the initial pair of estimated poses and the initial 3D structure; validating the optimized 3D structure by: calculating connectivity of edge points in the filtered thinned edges; determining spatial smoothness among 2D points in the initial pair of keyframes conforming to corresponding 3D structure points of the optimized 3D structure; identifying straight lines having same ordering of point feature correspondences in 2D and 3D using the calculated connectivity of edge points and based on a local neighborhood gradient; assigning a quality factor to the optimized 3D structure based on number of identified straight lines; comparing the assigned quality factor of the optimized 3D structure with an empirically defined threshold; identifying the optimized 3D structure as the validated 3D structure and the initial pair of keyframes as the selected pair of keyframes if the assigned quality factor is greater than the empirically defined threshold; iteratively checking the subsequent pairs of keyframes for identifying a pair of keyframes therein as the selected pair of keyframes, in the event that the assigned quality factor is less than the empirically defined threshold, wherein the selected pair of keyframes corresponds to a new 3D structure having the quality factor greater than the empirically defined threshold; and identifying the new 3D structure corresponding to the selected pair of keyframes as the validated 3D structure.

In an embodiment of the present disclosure, the one or more hardware processors are further configured to estimate a trajectory of estimated poses from the multiple unknown poses of the monocular camera by obtaining incremental poses using the validated 3D structure by: reconstructing the validated 3D structure by adding new 3D structure points based on triangulation of the point feature correspondences corresponding to each of the keyframes from the plurality of keyframes identified subsequent to the selected pair of keyframes; identifying co-visible keyframes from the plurality of keyframes, wherein the co-visible keyframes correspond to keyframes having more than 100 common visible 3D structure points; performing local bundle adjustment on the co-visible keyframes and the visible 3D structure points for optimizing the estimated poses of the monocular camera; and estimating the trajectory based on the optimized poses of the monocular camera.

In an embodiment of the present disclosure, the one or more hardware processors are further configured to perform camera track loss recovery for continuous tracking of the monocular camera by: estimating relative poses between a last keyframe and a current keyframe, from the acquired successive frames, based on 2D-2D point feature correspondences in a homogeneous coordinate system having a scale and origin that differs from a SLAM coordinate system; triangulating new 3D structure points between the last keyframe and the current keyframe based on the estimated relative poses; estimating a second last keyframe by using the triangulated new 3D structure points; and transforming the estimated keyframe from the homogeneous coordinate system into the SLAM coordinate system.

In an embodiment of the present disclosure, the one or more hardware processors are further configured to rectify drifts in the estimated trajectory captured in the multiple views using loop closure by: performing loop detection for finding loops in the estimated trajectory by: checking a match between a pair of keyframes using third order moment invariants providing a first matching score and a quadrant based matching providing a second matching score, wherein the pair of keyframes constitute the current keyframe and each of the subsequent keyframes, and wherein the quadrant based matching comprises dividing each of the keyframes into 16 quadrants and calculating a matching score based on matched quadrants between a pair of the keyframes, wherein the matched quadrants are identified based on an adaptive weighted average of number of edges, average edge pixel density and average intensity in each of the 16 quadrants; deriving a final matching score between the pair of keyframes by averaging the first matching score and the second matching score; deriving a set of third matching scores between the current keyframe and a maximum of 5 immediate neighboring keyframes having less than 30 degree viewing direction change; selecting a threshold, wherein the threshold is a lowest value of the set of third matching scores for the loop detection; calculating a fourth matching score of non-neighboring keyframes in the plurality of keyframes and retaining the keyframes having the fourth matching score above the selected threshold; identifying a keyframe as a matched keyframe for the loop with the current keyframe if a threshold constraint is satisfied, wherein the threshold constraint requires three consecutive keyframes having the fourth matching score more than the selected threshold; calculating point feature correspondences between the current keyframe and the matched keyframe; calculating a similarity transformation between the current keyframe and the matched keyframe using the calculated point feature correspondences to create a set of 3D-3D point correspondences therebetween; and selecting the matched keyframe as a loop keyframe of the current keyframe if the similarity transformation has number of inliers more than 100; and performing loop merging for correcting drifts in the estimation of the current keyframe and a subsequent keyframe by: updating the multiple estimated poses of the monocular camera for the current keyframe and neighboring keyframes thereof using the calculated similarity transformation; selecting a set of the 3D structure points visible to the matched keyframe and neighbors thereof and projecting the selected set of the 3D structure points to the current keyframe and neighbors thereof; checking the 3D-2D correspondences between the projected 3D structure points and the visible 3D structure points to the current keyframe and neighbors thereof; and merging of the visible 3D structure points having 3D-2D correspondences and considered as inliers to the similarity transformation; and performing the local global bundle adjustment on the plurality of keyframes constituting the loop and the 3D structure points therein.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1:
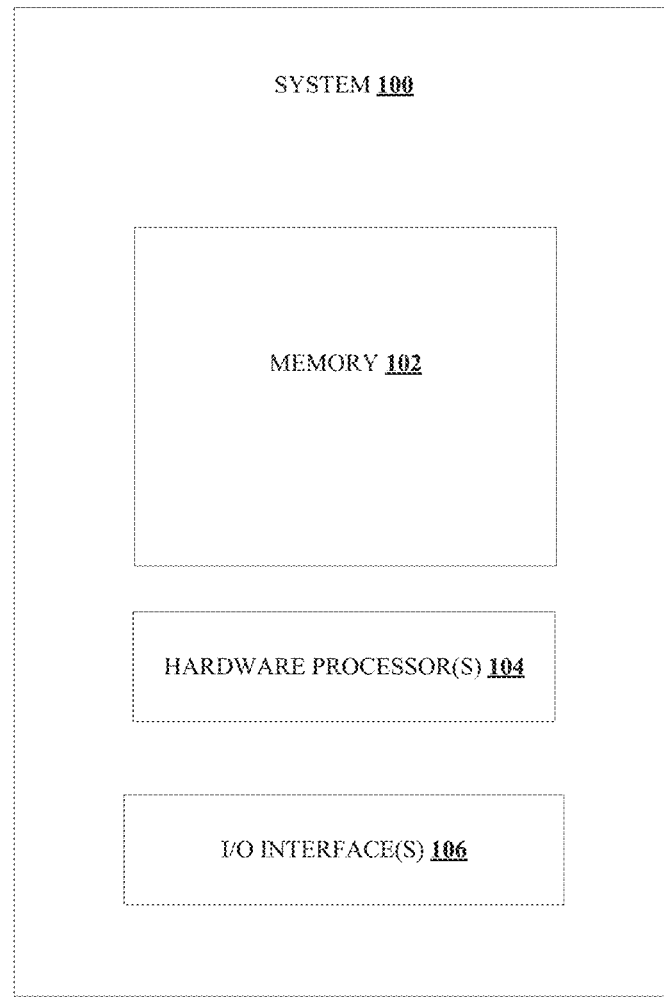
FIG. 1 illustrates an exemplary block diagram of a system for edge points based monocular visual simultaneous localization and mapping (SLAM), in accordance with an embodiment of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Feature based visual simultaneous localization and mapping (SLAM) do not produce reliable camera and structure estimates due to insufficient features in a low-textured environment. Moreover, existing visual SLAMs produce partial reconstruction when the number of 3D-2D correspondences is insufficient for incremental camera estimation using bundle adjustment, wherein bundle adjustment is an optimization technique to minimize re-projection error between projected points and observed points. Systems and methods of the present disclosure provide edge points based monocular visual SLAM to mitigate these issues.

Referring now to the drawings, and more particularly to FIGS. 1 through 10, where similar reference characters denote corresponding features consistently throughout the figures, there are shown preferred embodiments and these embodiments are described in the context of the following exemplary system and method.

FIG. 1 illustrates an exemplary block diagram of a system 100 for edge points based monocular visual simultaneous localization and mapping (SLAM), in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104.

The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

In an embodiment, the system 100 includes one or more data storage devices or memory 102 operatively coupled to the one or more processors 104 and is configured to store instructions configured for execution of steps of the method 200 by the one or more processors 104.

Figure 2:
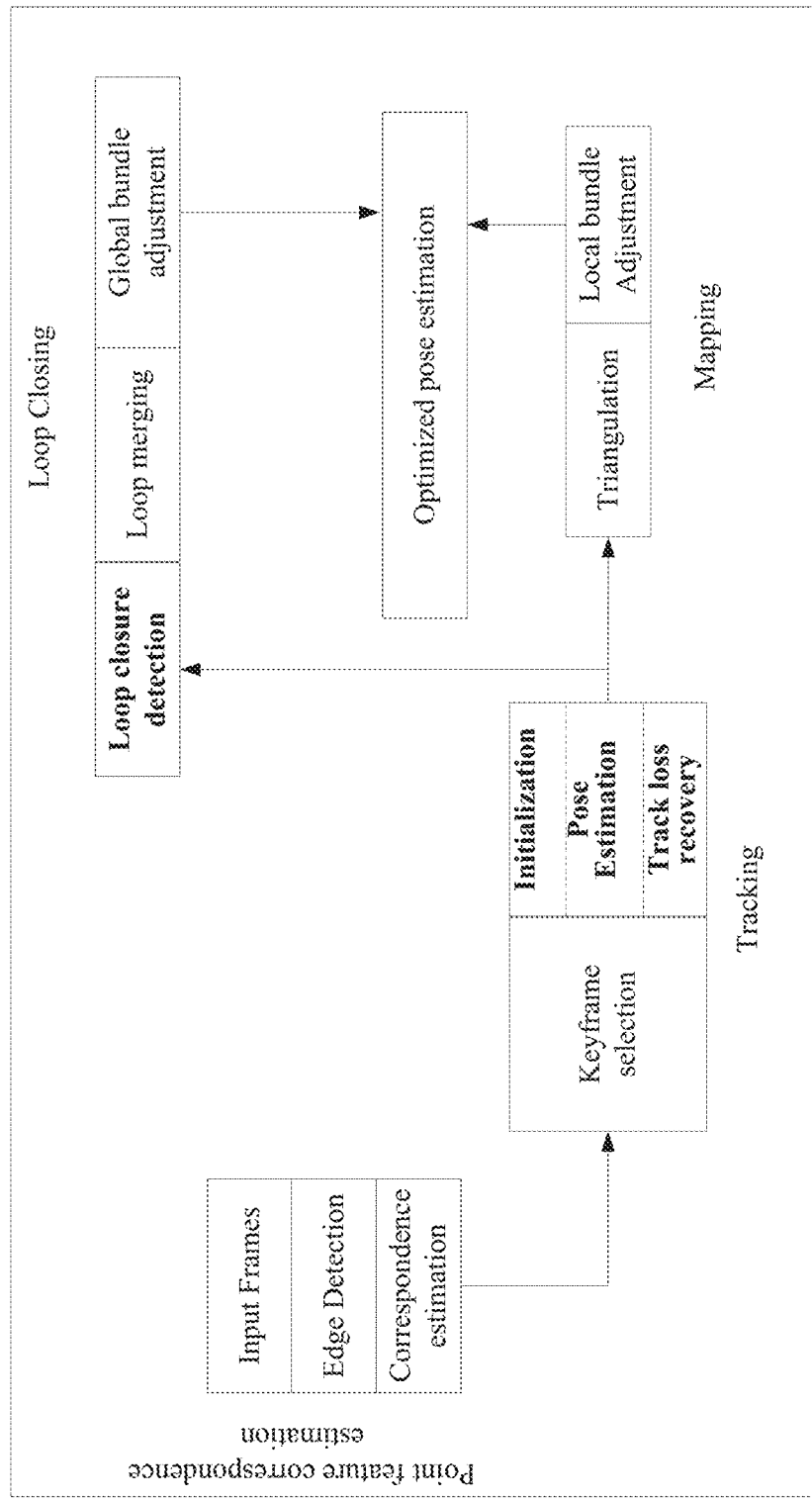
FIG. 2 illustrates a pipeline for edge points based monocular visual SLAM, in accordance with an embodiment of the present disclosure.
Figure 3A:
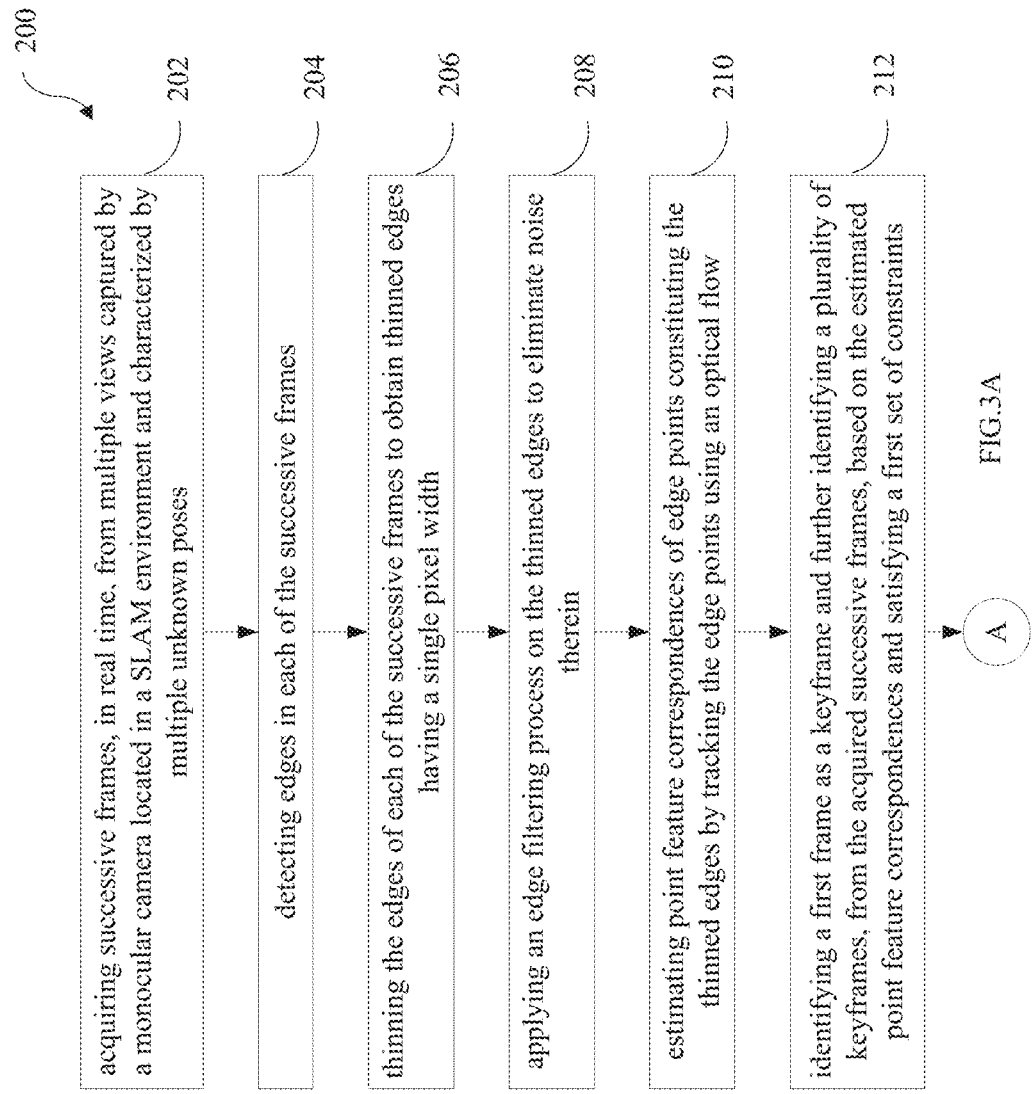
FIG. 3A and FIG. 3B is an exemplary flow diagram illustrating a computer implemented method for edge points based monocular visual SLAM, in accordance with an embodiment of the present disclosure.
Figure 3B:
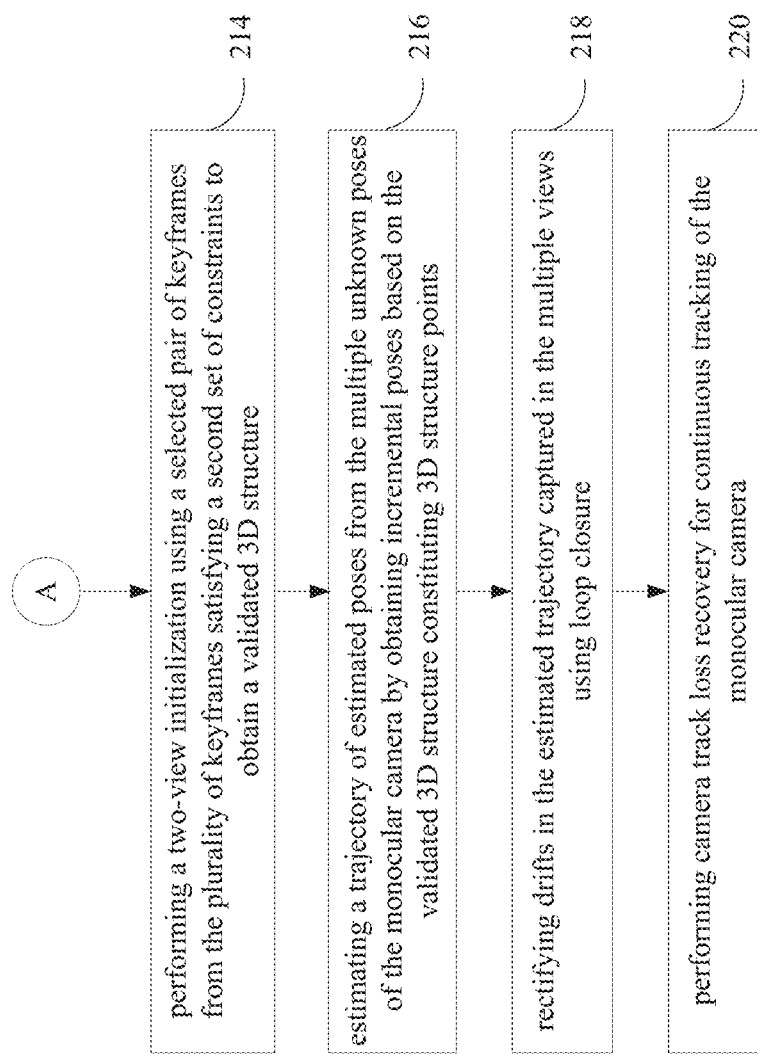

FIG. 2 illustrates a pipeline for edge points based monocular visual simultaneous localization and mapping (SLAM) with bold texts particularly referring to contributions in one or more steps in accordance with the present disclosure and FIG. 3A and FIG. 3B is an exemplary flow diagram illustrating a computer implemented method for edge points based monocular visual SLAM, in accordance with an embodiment of the present disclosure. The steps of the method 200 will now be explained in detail with reference to the components of the system 100 of FIG. 1 and the pipeline depicted in FIG. 2. It may be noted that the pipeline may not depict the exact flow of steps and one or more steps may be performed in parallel with one or more other steps. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Figure 4B:
FIG. 4B illustrates a reconstructed sparse 3D structure corresponding to FIG. 4A, generated by the system of FIG. 1, in accordance with an embodiment of the present disclosure.
Figure 4A:
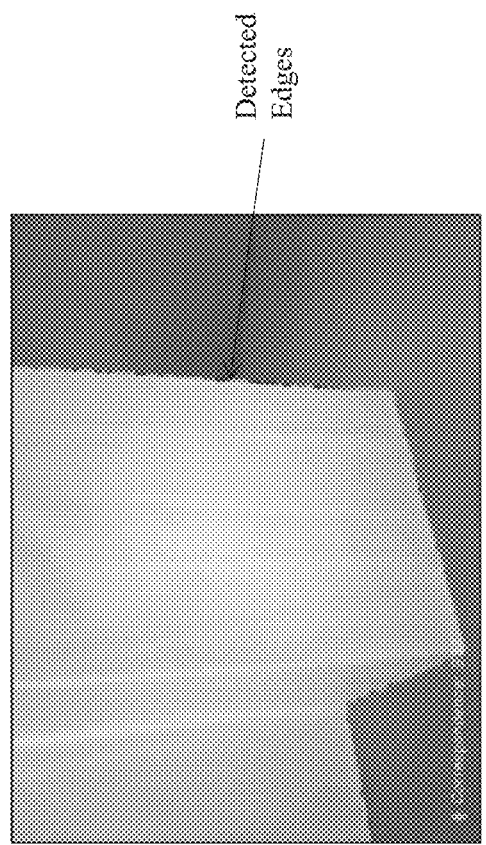
FIG. 4A illustrates an image from an exemplary low-textured sequence with edges detected for computing point feature correspondences, in accordance with an embodiment of the present disclosure.
Figure 4C:
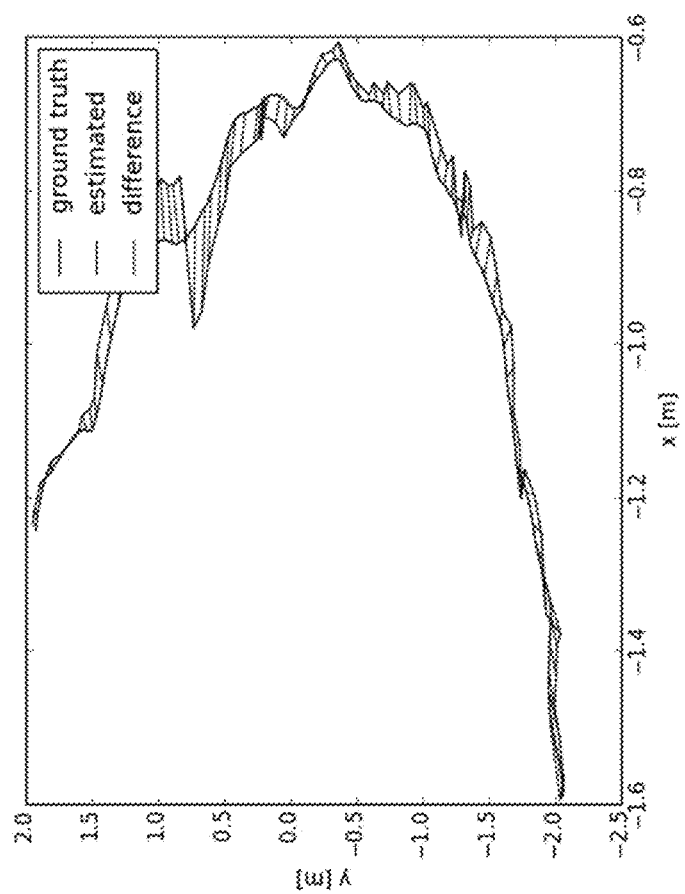
FIG. 4C illustrates a comparison of estimated poses corresponding to FIG. 4A by the system of FIG. 1, in accordance with an embodiment of the present disclosure against ground truth by a proprietary benchmarking tool for the exemplary sequence of FIG. 4A.
Figure 4E:
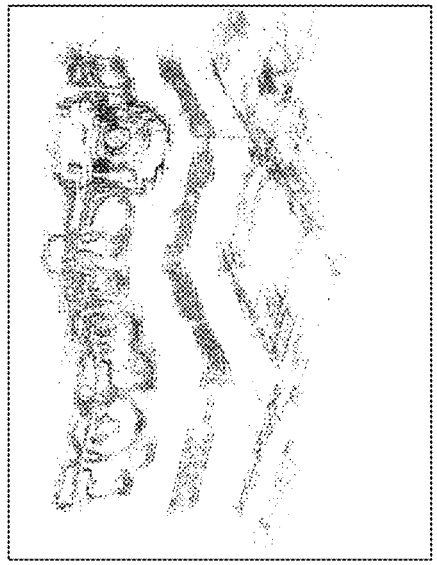
FIG. 4E illustrates a reconstructed 3D structure corresponding to FIG. 4D, generated by the system of FIG. 1, in accordance with an embodiment of the present disclosure.
Figure 4D:
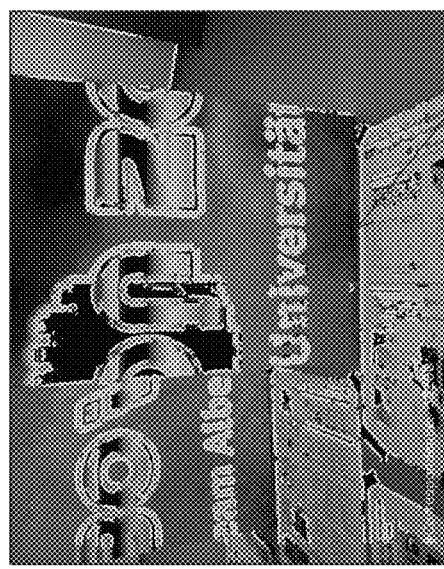
FIG. 4D illustrates an image from an exemplary textured sequence with edges detected for computing point feature correspondences.
Figure 4F:
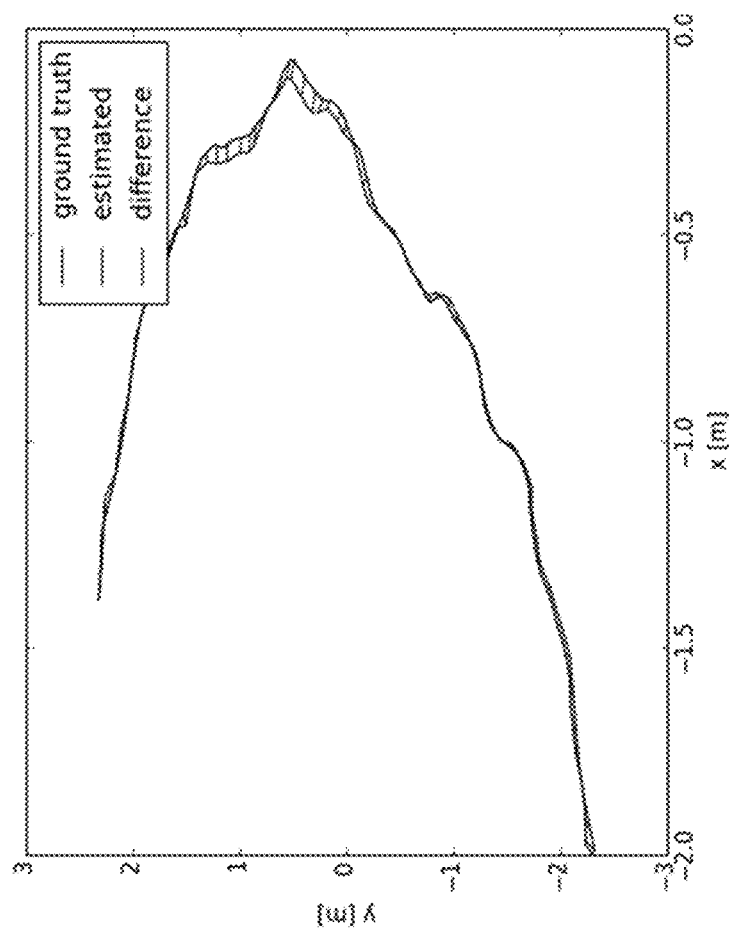
FIG. 4F illustrates a comparison of estimated poses corresponding to FIG. 4D by the system of FIG. 1, in accordance with an embodiment of the present disclosure against ground truth by a proprietary benchmarking tool for the exemplary sequence of FIG. 4D.

FIG. 4A through FIG. 4F represent the outcome of the systems and methods of the present disclosure in a low textured and textured environment. Particularly, FIG. 4A illustrates an image from an exemplary low-textured sequence (fr3_str_notex_far) with edges detected for computing point feature correspondences. FIG. 4B illustrates a reconstructed sparse 3D structure corresponding to FIG. 4A, generated by the system of FIG. 1, in accordance with an embodiment of the present disclosure. FIG. 4C illustrates a comparison of estimated poses corresponding to FIG. 4A by the system of FIG. 1, in accordance with an embodiment of the present disclosure against ground truth by a proprietary benchmarking tool for the exemplary sequence of FIG. 4A. Again, FIG. 4D illustrates an image from an exemplary textured sequence (fr3_str_tex_far) with edges detected for computing point feature correspondences. FIG. 4E illustrates a reconstructed 3D structure corresponding to FIG. 4D, generated by the system of FIG. 1, in accordance with an embodiment of the present disclosure. FIG. 4F illustrates a comparison of estimated poses corresponding to FIG. 4D by the system of FIG. 1, in accordance with an embodiment of the present disclosure against ground truth by a proprietary benchmarking tool for the exemplary sequence of FIG. 4D. As seen from FIG. 4A through FIG. 4F, it may be noted that the systems and methods of the present disclosure work effectively in both low textured and textured environment.

The description hereunder with reference to the accompanying figures, illustrate implementation of the systems and methods of the present disclosure that enables the illustrations in FIG. 4A through FIG. 4F. In accordance with an embodiment of the present disclosure, the one or more processors 104 are configured to acquire successive frames (input frames of FIG. 2), in real time, at step 202, from multiple views captured by a monocular camera located in a SLAM environment and characterized by multiple poses that are yet not known or referred to as unknown poses. In the context of the present disclosure, a SLAM environment may include the monocular camera, structure of the environment being tracked, camera poses indicative of camera position and orientation and camera views. Feature correspondence estimation is a major step which decides the overall performance of any feature correspondence based visual SLAM. Accordingly, in accordance with the present disclosure, point feature correspondence of edge points constituting edges in each of the successive frames is estimated. Precise location of an edge and its repetition in successive frames is very important for edge-point tracking. In an embodiment, edge detection at step 204, is based on a Difference of Gaussians (DoG) method. The DoG method is reliable due to its robustness in illumination and contrast changes.

In accordance with an embodiment of the present disclosure, the one or more processors 104 are configured to thin the edges of each of the successive frames, at step 206, to obtain thinned edges having a single pixel width. An edge filtering process is then applied, at step 208, on the thinned edges to eliminate noise, if any.

In accordance with an embodiment of the present disclosure, the one or more processors 104 are configured to estimate point feature correspondences of edge points constituting the thinned edges, at step 210, by tracking the edge points using an optical flow. In an embodiment, a bi-directional sparse iterative and pyramidal version of the Lucas-Kanade optical flow on intensity images (using pixel values associated with the thinned edges) may be used for estimating point feature correspondences of the edge points. A window based approach of optical flow is employed in accordance with the present disclosure to avoid aperture problems associated with camera or motion capture systems.

In accordance with an embodiment of the present disclosure, the one or more processors 104 are configured to identify a first frame as a keyframe and further identify a plurality of keyframes from the acquired successive frames, at step 212, based on the estimated point feature correspondences and satisfying a first set of constraints. Keyframes are a subset of frames, which are identified to avoid low parallax error and redundancy for robotic movement. The overall accuracy of the system 100 depends on keyframe selection and number of keyframes. Let and $I_{t-1}$ and $I_t$ represent two consecutive frames amongst the acquired successive frames. The current frame $I_t$ and a last identified keyframe ($K_m$) are processed for next (new) keyframe selection, wherein $0 \leq m < t-1$. The next keyframe is identified based on the first set of constraints. In an embodiment, the first set of constraints may include one or more of:

(i) pairwise rotation constraint between a current frame and a last identified keyframe from the acquired successive frames, the pairwise rotation being calculated using epipolar geometry, wherein if the rotation between current frame and the last identified keyframe is more than 15°, consider a previous frame as a new keyframe;

(ii) average number of tracked point feature correspondence constraint for each of the successive frames, wherein if number of 2D point feature correspondences between the current frame and the last identified keyframe falls below thirty percent of an average point feature correspondence, consider a previous frame as a new keyframe;

(iii) number of 3D-2D point feature correspondences constraint, wherein if number of 3D-2D point feature correspondences reduces below 250, consider a next frame as a new keyframe;

(iv) average positional change of point feature correspondences constraint, wherein if average positional change between the current frame and the last identified keyframe obtained by averaging Euclidean distance between previous and current pixel positions of all point feature correspondences, is more than twenty percent of width of an associated frame, consider the current frame as a new keyframe; and (v) consider a new keyframe in a fixed interval of 1 second.

Figure 5:
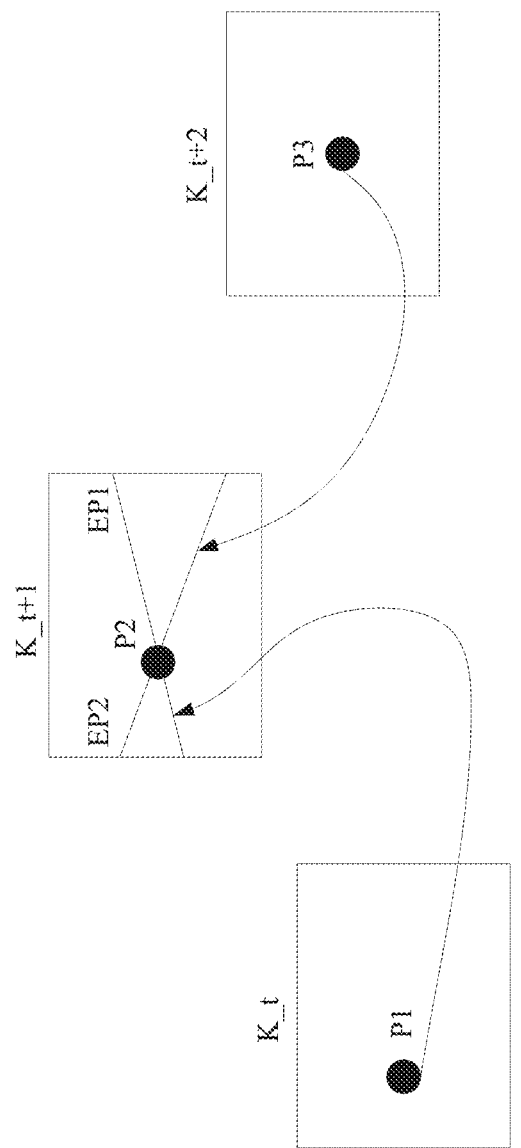
FIG. 5 illustrates three view validation of point feature correspondence in accordance with an embodiment of the present disclosure.

Point feature correspondences obtained using only optical flow may contain noise and therefore, in an embodiment, the point feature correspondences may be refined using epipolar geometry between three successive keyframes. Firstly, redundant pixels (pixels whose Euclidean distance is very low) may be discarded; then points having a high bi-directional positional error may be eliminated. FIG. 5 illustrates three view validation of point feature correspondence in accordance with an embodiment of the present disclosure. If a 2-dimensional (2D) point feature correspondence is present in three successive keyframes (K_t, K_t+1, K_t+2), corresponding epilines (EP1, EP2) are calculated on a middle keyframe (K_t+1) of the three successive keyframes and 2D correspondences (P1, P3) which do not lie at the intersection of the corresponding epilines are discarded. To reduce drift in trajectory of estimated poses (explained later), forward correspondences which are non-edge points may be discarded.

In accordance with an embodiment of the present disclosure, the one or more processors 104 are configured to perform a two-view initialization using a selected pair of keyframes (two-views) from the plurality of keyframes, at step 214, to obtain a validated 3D structure, wherein the selected pair of keyframes satisfy a second set of constraints. In an embodiment, the second set of constraints may include one or more of:

(i) pairwise rotation between the selected pair of keyframes is more than 15°;

(ii) averaging Euclidean distance between previous and current pixel positions of all point feature correspondences pertaining to the selected pair of keyframes exceed 20 percent of frame width; and (iii) time difference of 1 second between the selected pair of keyframes.

The selected pair used for the two-view initialization of the camera is critical for determining the quality of 3D structure estimation which in turn estimates a trajectory of estimated poses effectively.

In an embodiment, the step of performing two-view initialization comprises iteratively performing the sub-steps explained herein after. Firstly, poses are estimated for an initial pair of keyframes from the acquired successive frames using a five-point method, wherein the poses correspond to the multiple unknown poses. An initial 3D structure comprising a set of 3D structure points is then generated by triangulation using the estimated poses. The initial 3D structure is then optimized using global bundle adjustment (optimizing all the camera poses as well as all 3D structure points at the same time) periodically on the initial pair of estimated poses and the initial 3D structure and further validated.

In an embodiment, the optimized 3D structure may be validated by firstly calculating connectivity of edge points in the filtered thinned edges. Edge continuity may not be calculated properly if the frames are blurred or defocused. Blurred frames are high contributing attributes for erroneous feature correspondences as well. Such frames may be identified and discarded based on an adaptive thresholding method using variance of gray intensities of edge points of the whole frame. Spatial smoothness among 2D points in the initial pair of keyframes conforming to corresponding 3D structure points of the optimized 3D structure is then determined. An edge may be considered as a connected straight line of a short length and a straight line in 3D should have same continuation. Accordingly, straight lines having same ordering of point feature correspondences in 2D and 3D are identified using the calculated connectivity of edge points and based on a local neighborhood gradient. In particular, any two neighboring edge points in 2D should also be neighbors in 3D. The number of such short straight lines in both 2D and in the optimized 3D structure signifies the quality of the optimized 3D structure. Accordingly, a quality factor may be assigned to the optimized 3D structure based on number of identified straight lines. The assigned quality factor of the optimized 3D structure is compared with an empirically defined threshold. If the assigned quality factor is greater than the empirically defined threshold, the optimized 3D structure may be identified as the validated 3D structure and the initial pair of keyframes as the selected pair of keyframes. If the assigned quality factor is less than the empirically defined threshold, the subsequent pairs of keyframes are iteratively checked for identifying a pair of keyframes that may qualify as the selected pair of keyframes corresponding to a new 3D structure having the quality factor greater than the empirically defined threshold. The new 3D structure corresponding to the selected pair of keyframes is then identified as the validated 3D structure.

Figure 6B:
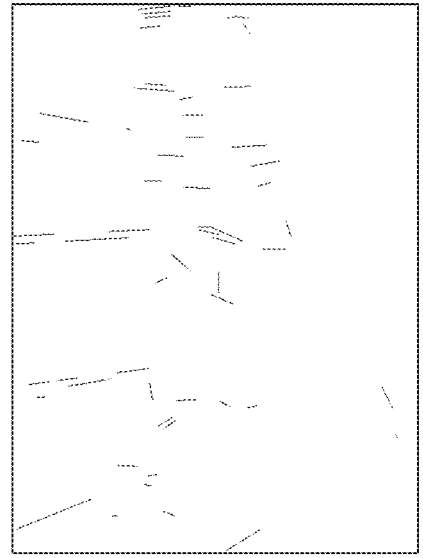
FIG. 6A, FIG. 6B and FIG. 6C illustrate two view initialization of the monocular camera in accordance with an embodiment of the present disclosure.
Figure 6C:
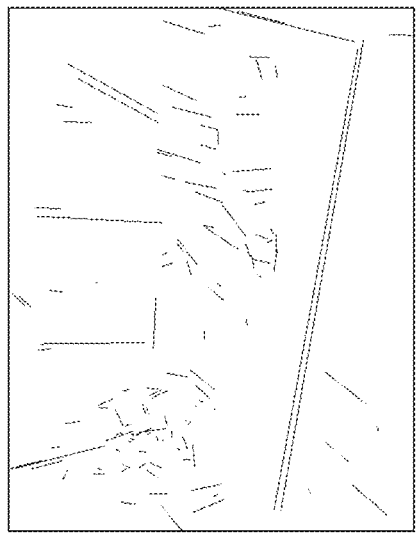
Figure 6A:
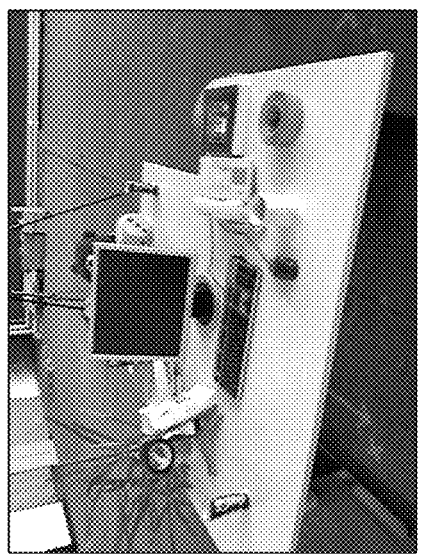

FIG. 6A, FIG. 6B and FIG. 6C illustrate two view initialization, in accordance with an embodiment of the present disclosure on an exemplary proprietary RGB-D benchmark dataset, wherein FIG. 6A represents a sample image from an exemplary sequence (fr2_desk). Initialization until a particular frame (frame number 11 in the given example—not shown in the figure) produces a discontinuous 3D structure as illustrated in FIG. 6B. The root mean square (RMS) of Absolute Trajectory Error (ATE) against ground-truth till a further frame (number 117 in the given example— not shown in the figure) with such initialization is 1.12 cm. Due to the quality factor being lesser than the empirically defined threshold, the associated key frames are not considered for initialization of the camera. Initialization at frame 34 (not shown in the figure) generated a continuous 3D structure as illustrated in FIG. 6C. The associated qualify factor was also greater than the empirically defined threshold. The RM) of ATE against ground-truth till frame number 117 (not shown in the figure) with such initialization is now 0.48 cm. This is a clear indication that two-view initialization using a selected pair of keyframes wherein the associated 3D structure has a high quality factor is better than initialization using any two keyframes which may produce a sparse or noise 3D structure.

In accordance with an embodiment of the present disclosure, the one or more processors 104 are configured to estimate a trajectory of estimated poses, at step 216, from the multiple unknown poses of the monocular camera by obtaining incremental poses based on the validated 3D structure constituting 3D structure points. Keyframes were identified based on the first set of constraints in step 212. The validated 3D structure is reconstructed by adding new 3D structure points based on triangulation of the point feature correspondences corresponding to each of the keyframes from the plurality of keyframes identified subsequent to the selected pair of keyframes. Keyframes are identified as co-visible keyframes if they have more than a pre-determined common visible 3D structure points (for instance 100 visible 3D structure points). If K represents a set of the plurality of keyframes and C represents a keyframe $K_m$ and its co-visible keyframes, $C \subseteq K$. A 3D point set B contains all 3D points visible by all the keyframes of the set C. Local bundle adjustment (optimizing only a subset of camera poses and visible 3D structure points by the estimated camera poses) is then performed on the co-visible keyframes C and the visible 3D structure points B for optimizing the estimated poses of the monocular camera.

$$\min_{C_j, B_i} \sum_{i=1}^{n} \sum_{j=1}^{m} V_{ij} D(P(C_j, B_i), x_{ij} \Psi(x_{ij})) \rightarrow (1)$$

wherein, $V_{ij} \in \{0, 1\}$ is the visibility of the $i^{th}$ 3D structure point in the $j^{th}$ keyframe, P is the function which projects a 3D structure point $B_i$ onto the keyframe $C_j$ which is modeled using 7 parameters (1 for focal length, 3 for rotation, 3 for position), $x_{ij}$ is the actual projection of the $i^{th}$ 3D structure point onto the $j^{th}$ keyframe, $\Psi(x_{ij})=1+r\|x_{ij}\|^2$ is a radical distortion function with a single parameter (r) and D is the Euclidean distance. Equation (1) is minimized and focal length of the camera is fixed using a known internal calibration and the estimated poses are optimized. The trajectory is then estimated based on the optimized poses of the monocular camera.

Track-loss is one of the major issues faced by visual SLAM wherein there may be breaks during reconstructing of the validated 3D structure due to camera tracking failure. Some of the dominant reasons for such failure are occlusion, abrupt motion, corresponding structure point reduction in bundle adjustment, reduction in the number of 2D point correspondences due to low-textured environment etc. Conventional SLAM tries to re-localize after track-loss but re-localization is not guaranteed in robotic movements unless the camera returns back very near to its previously visited location. In accordance with an embodiment of the present disclosure, for continuous tracking of the monocular camera, the one or more processors are configured to perform camera track loss recovery, at step 220. This involves estimating relative poses between a last keyframe and a current keyframe, from the acquired successive frames, based on 2D-2D point feature correspondences in a homogeneous coordinate system having a scale and origin that differs from a SLAM coordinate system; triangulating new 3D structure points between the last keyframe and the current keyframe based on the estimated relative poses; estimating a second last keyframe by using the triangulated new 3D structure points; and transforming the estimated keyframe from the homogeneous coordinate system into the SLAM coordinate system.

If a sequence of three consecutive keyframes $K_{t-2}$ (second last keyframe), $K_{t-1}$ (last keyframe) and $K_t$ (current keyframe) are considered, wherein $K_{t-2}$ and $K_{t-1}$ are already estimated in the SLAM coordinate system and it is unable to track the current keyframe $K_t$, there may be two possible reasons for tracking failure.

Case 1: Say, 2D correspondences exist in all three keyframes $K_{t-2}$, $K_{t-1}$ and $K_t$ but the pipeline rejects the corresponding 3D-2D correspondences due to high re-projection error on keyframes $K_{t-2}$ and $K_{t-1}$. In this case 2D correspondences may be used for estimating $K_t$.

Case 2: Say, 2D correspondence exists till keyframe $K_{t-1}$ and absent in $K_t$ due to unstable optical flow. Therefore 3D-2D correspondences are ill-conditioned for keyframe $K_t$. This case may be considered out of the scope as optical flow fails.

Figure 7:
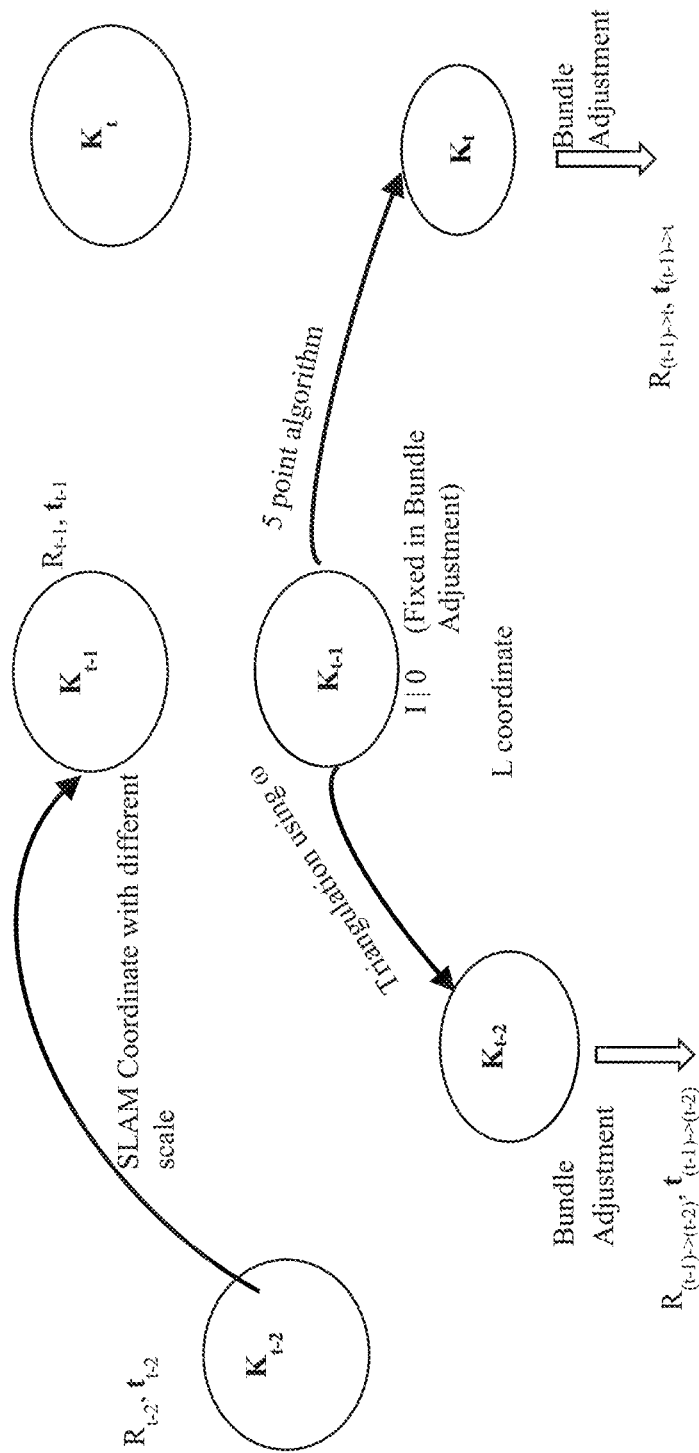
FIG. 7 illustrates camera track loss recovery in accordance with an embodiment of the present disclosure.

The keyframe $K_t$ is first estimated separately from the SLAM coordinate system using 2D-2D point correspondences. Epipolar geometry provides a pairwise rotation and a unit direction from frame $K_{t-1}$ to frame $K_t$ in a coordinate system, referred as $L \in \mathbb{R}^3$, where frame $K_{t-1}$ is at the origin, and has an unknown scale difference with the SLAM coordinate system. New 3D structure points are created with 2D correspondences and poses of frames $K_{t-1}$ and $K_t$ are estimated in L through triangulation and the frame $K_{t-2}$ in L is re-estimated utilizing 3D-2D correspondences. Bundle adjustment further refines the poses for frames $K_{t-2}$ and $K_t$ without changing the coordinate system i.e. pose for frame $K_{t-1}$ remain unchanged after bundle adjustment. Bundle adjustment produces stable pairwise rotation and translation pair ($R_{(t-1) \rightarrow t}$, $t_{(t-1) \rightarrow t}$), ($R_{(t-1) \rightarrow (t-2)}$, $t_{(t-1) \rightarrow (t-2)}$) for frames $K_t$ and $K_{t-2}$ respectively. The pipeline continues only when bundle adjustment produces enough inliers 3D structure points (for instance, more than 100 3D structure points), else re-localization may be performed. The co-ordinate system L is merged with the SLAM coordinate system after correcting the scale difference. FIG. 7 illustrates track loss recovery in accordance with an embodiment of the present disclosure, wherein the three frames $K_{t-2}$, $K_{t-1}$ and $K_t$ are estimated in L and then merged with the SLAM coordinate system.

The scale difference between the two coordinate systems is calculated using the estimations of frames $K_{t-2}$ and $K_{t-1}$ in both the SLAM and L coordinate system using equation (2) herein below herein, $C_{L_i}$ and $C_{S_i}$ denote the camera center of the $i^{th}$ frame in the L and the SLAM coordinate system respectively.

$$\lambda_{init} = \frac{C_{S(t-1)} - C_{S(t-2)}}{C_{L(t-1)} - C_{L(t-2)}} \rightarrow (2)$$

Scale corrected camera center $C_{scaled\_t}$ for frame $K_t$ in L follows the relation given in equation (3) herein below.

$$C_{scaled\_t} = \lambda_{init}(-R_{(t-1)\to t}t_{(t-1)\to t}) \quad (3)$$

The axes of both the coordinate systems are required to be aligned in order to merge them. Therefore, the SLAM coordinate axes are rotated to align with the frame $K_{t-1}$ and the camera center for the frame $K_t$ is calculated in the rotated SLAM coordinate system through equation (4) below the camera center for the frame $K_t$ is calculated in the SLAM coordinate system through a reverse rotation as given in equation (5) below.

$$C_{S\_t\_rot}{}^T = C_{S(t-1)}{}^T R_{t-1}{}^T + C_{scaled\_t}{}^T \quad (4)$$

$$C_{S_t}{}^T = C_{S\_t\_rot}{}^T * R_{t-1} \quad (5)$$

Pairwise rotation is always independent of any coordinate system and thus pairwise rotation of the frame $K_t$ is used to get absolute rotation $R_t$ in the SLAM coordinate system based on equation (6) below, where $R_{t-1}$ is the absolute rotation of the frame $K_{t-1}$ in the SLAM coordinate system.

$$R_{(t-1)\to t} = R_t * R_{t-1}{}^T \quad (6)$$

Finally a translation vector $t_{S\_t}$ of the frame $K_t$ is calculated in the SLAM coordinate system using equation (7) below and the 2D correspondences present in ω set are included in to the SLAM coordinate system by triangulation for better connectivity between the current frame with previous frames. Estimated pose for the frame $K_t$ in the SLAM coordinate system may be erroneous and local adjustment may be performed to further refine the poses.

$$t_{S\_t} = -R_t * C_{S\_t} \quad (7)$$

If the bundle adjustment produces enough inliers, incremental tracking continues from next frame onwards otherwise the pipeline initiates entire track-loss avoidance procedure from beginning for a next frame.

Figure 8:
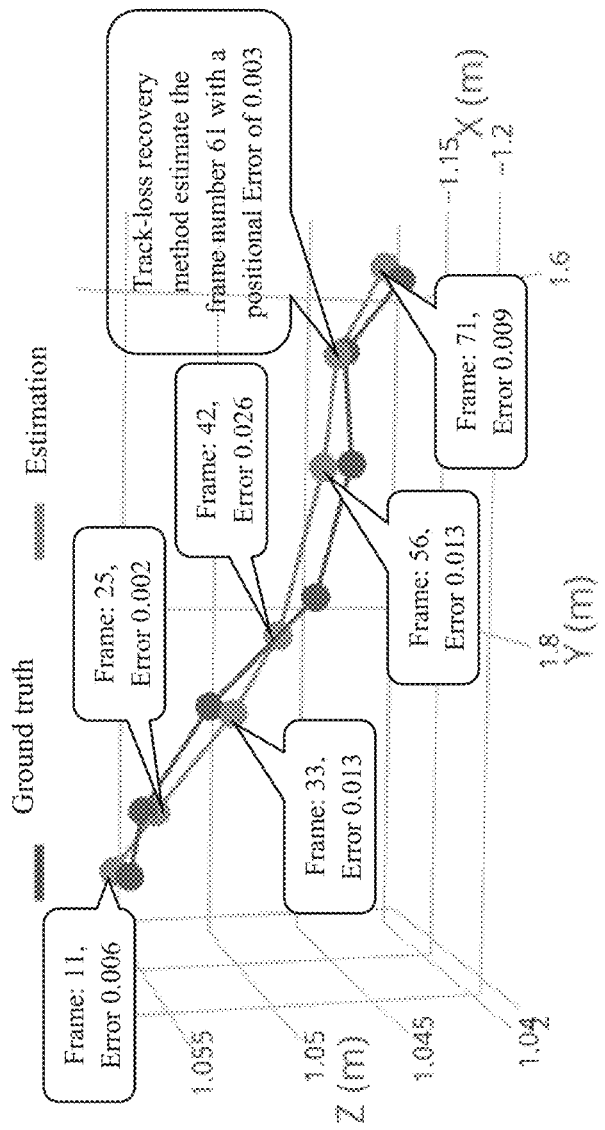
FIG. 8 illustrates validation of the camera track loss recovery in accordance with an embodiment of the present disclosure.

The step of track loss recovery was evaluated using low-textured data where camera estimation becomes unreliable at frame number 61 due to insufficient 3D-2D correspondences. The track loss recovery in accordance with the present disclosure was noted to estimate the keyframe with a positional error of 0.3 cm against ground-truth. FIG. 8 illustrates validation of track loss recovery in accordance with an embodiment of the present disclosure. Table 1 below presents a detailed result of the evaluation on some standard sequences of a proprietary RGB-D benchmark and ICL-NUIM.

TABLE 1

Comparison among ORB SLAM, LSD SLAM and the method of the present disclosure in low-textured sequences.

| Sequences | ORB-SLAM Track loss | LSD-SLAM Track loss | No. of times track loss recovery used in accordance with the present disclosure | RMS of ATE (cm) |
| --- | --- | --- | --- | --- |
| fr3_str_notex_near | Unable to initialize | Frame 533 | 12 | 8.29 |
| fr3_str_notex_far | Unable to initialize | Frame 357 | 7 | 6.71 |
| ICL/of fice1 | Frame 354 | Frame 193 | 5 | 19.5 |

The result in Table 1 shows ORB SLAM is unable to initialize in the sequence fr3_str_notex_near and fr3_str_notex_far. It was also observed that camera tracking failed in the sequence ICL/of fice1. LSD SLAM failed in camera tracking in all the three sequences. The track loss recovery method of the present disclosure was able to produce correct estimation of camera poses in all the three sequences.

Incremental pose estimations may accumulate errors and create a drift in the estimated trajectory. In accordance with the present disclosure, loop closure rectifies such drift by matching structural properties of frames between non-neighboring keyframes (that do not share any point correspondences). A loop is considered if two non-neighboring estimated keyframes share a similar scene from a different view point. Accordingly, in an embodiment of the present disclosure, the one or more processors are configured to rectify drifts in the estimated trajectory captured in the multiple views, at step 218, using loop closure which comprises performing loop detection for finding loops in the estimated trajectory; performing loop merging for correcting drifts in the estimation of the current keyframe and a subsequent keyframe; and performing the global bundle adjustment on the plurality of keyframes constituting the loop and the 3D structure points therein.

In accordance with an embodiment of the present disclosure, the step of performing loop detection for finding loops in the estimated trajectory tries to find a loop only on keyframes in a manner that is invariant to scale changes, translation and rotation of scene structure. Frame moment invariants are invariant of those specific transformations and are hence used as features when dealing with a large set of frames and a large displacement followed by a multilevel matching mechanism. Accordingly, for finding loops, firstly a match between a pair of keyframes is checked using third order moment invariants providing a first matching score and a quadrant based matching providing a second matching score, wherein the pair of keyframes constitute the current keyframe and each of the subsequent keyframes. The quadrant based matching comprises dividing each of the keyframes into 16 quadrants and calculating a matching score based on matched quadrants between a pair of the keyframes, wherein the matched quadrants are identified based on an adaptive weighted average of number of edges, average edge pixel density and average intensity in each of the 16 quadrants. A final matching score is then derived between the pair of keyframes by averaging the first matching score and the second matching score. A set of third matching scores is derived between the current keyframe and a maximum of 5 immediate neighboring keyframes having less than 30 degree viewing direction change. A threshold $M_{min}$, being a lowest value of the set of third matching scores for the loop detection is selected. A fourth matching score of non-neighboring keyframes in the plurality of keyframes is calculated and the keyframes having the fourth matching score above the selected threshold $M_{min}$ are retained. A keyframe is identified as a matched keyframe for the loop (loop candidate $K_{loop}$) with the current keyframe if a threshold constraint is satisfied, wherein the threshold constraint requires three consecutive keyframes having the fourth matching score more than the selected threshold. Point feature correspondences between the current keyframe and the matched keyframe ($K_{loop}$) is then calculated using which a similarity transformation $T^{sim}$ is calculated to create a set of 3D-3D point correspondences therebetween. The matched keyframe ($K_{loop}$) is selected as a loop keyframe of the current keyframe if the similarity transformation $T_{sim}$ has adequate number of inliers, for instance, more than 100.

In accordance with an embodiment of the present disclosure, the step of performing loop merging for correcting drifts in the estimation of the current keyframe and a subsequent keyframe comprises firstly updating the multiple estimated poses of the monocular camera for the current keyframe and neighboring keyframes thereof using the calculated similarity transformation $T_{sim}$. A set of the 3D structure points $M_{loop}$ visible to the matched keyframe $K_{loop}$ and neighbors thereof are selected and the selected set is then projected to the current keyframe and neighbors thereof. The 3D-2D correspondences between the projected 3D structure points and the visible 3D structure points $M_t$ to the current keyframe and neighbors thereof are checked and the visible 3D structure points having 3D-2D correspondences are merged and considered as inliers to the similarity transformation $T_{sim}$.

Experimental Results

An Intel™ Core i7-7700 (4 cores @3.60 GHz) with 8 Gb RAM was used, for implementation of the SLAM pipeline in accordance with the present disclosure. The experiment was performed using a proprietary RGB-D benchmark datasets and ICL-NUIM dataset. The proprietary RGBD Benchmarking tool was used to compare the camera estimations by the SLAM of the present disclosure against ground-truth. Table 2 also shows the comparison of Absolute Trajectory Errors by the SLAM of the present disclosure referred to as Edge SLAM, LSDSLAM, ORB-SLAM, Edge VO and PL SLAM. It is evident that unlike the existing pipelines, the Edge SLAM works on all kind of datasets reliably. The pipeline of the present disclosure also produced accurate structure and camera estimations even for a low-textured environment where most of the existing SLAMs fail in tracking (six rows from bottom of Table 2).

TABLE 2

Keyframe localization error comparison. X denotes unsuccessful cases.
Absolute keyframe Trajectory RMS error (cm)

| Sequences | Edge SLAM | ORB-SLAM | LSD-SLAM | Edge VO | PL SLAM |
|---|---|---|---|---|---|
| fr1 xyz | 1.31 | 0.90 | 9.00 | 16.51 | 1.21 |
| fr2 desk | 1.75 | 0.88 | 4.57 | 33.67 | — |
| fr2 xyz | 0.49 | 0.33 | 2.15 | 21.41 | 0.43 |
| fr3 str tex near | 1.12 | 1.58 | X | 47.63 | 1.25 |
| fr3 str tex far | 0.65 | 0.77 | 7.95 | 121.00 | 0.89 |

TABLE 2-continued

Keyframe localization error comparison. X denotes unsuccessful cases.
Absolute keyframe Trajectory RMS error (cm)

| Sequences | Edge SLAM | ORB-SLAM | LSD-SLAM | Edge VO | PL SLAM |
|---|---|---|---|---|---|
| fr3 str notex near | 8.29 | X | X | 101.03 | — |
| fr3 str notex far | 6.71 | X | X | 41.76 | — |
| ICL/office0 | 3.21 | 5.67 | X | X | — |
| ICL/office1 | 19.5 | X | X | X | — |
| ICL/office2 | 2.97 | 3.75 | X | X | — |
| ICL/office3 | 4.58 | 4.58 | X | X | — |

Figure 9A:
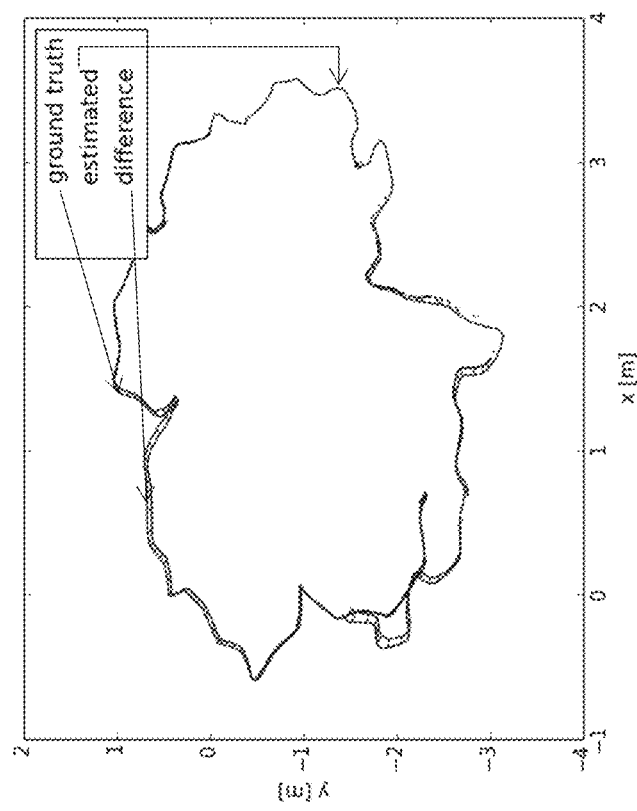
FIG. 9A and FIG. 9B illustrate estimated trajectory captured in multiple views captured by a monocular camera using loop closure in accordance with an embodiment of the present disclosure.
Figure 9B:
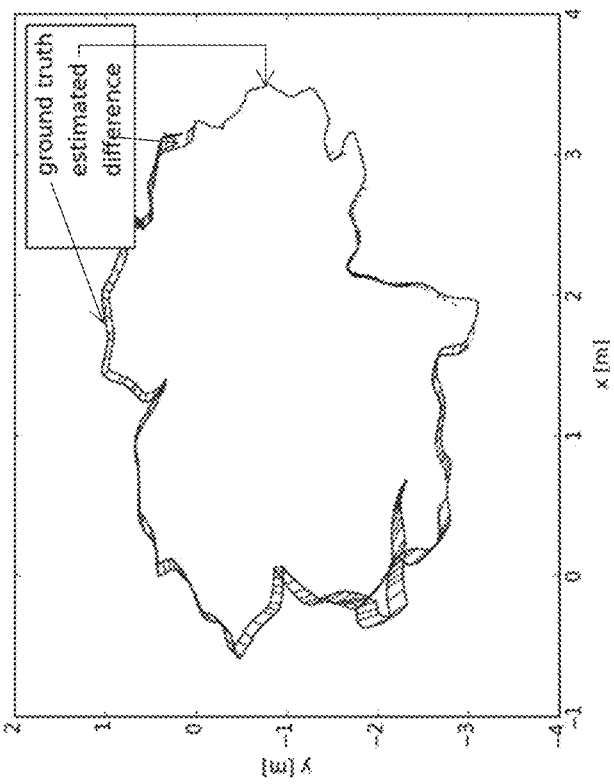

The most recent visual odometry pipeline Edge VO is limited to produce only camera localization without any map and produces the most erroneous result as shown in Table 2. FIG. 8 illustrates estimated trajectory captured in the multiple views captured by a monocular camera using loop closure in accordance with an embodiment of the present disclosure. Sequence fr2 desk was used where the RMS of ATE is reduced from 9.5 cm to 1.75 cm after loop closing in accordance with the present disclosure. FIG. 9A illustrates ground truth, estimated trajectory and difference before closing wherein the RMS of ATE is 9.5 cm. FIG. 9B illustrates ground truth, estimated trajectory and difference after closing wherein the RMS of ATE is 1.75 cm.

Figure 10A:
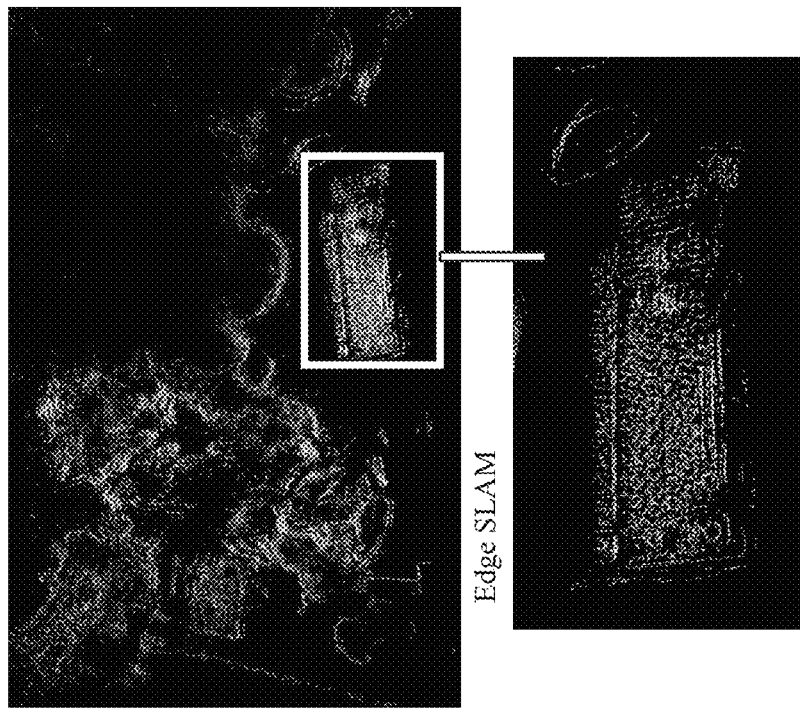
FIG. 10A and FIG. 10B illustrate a comparison of 3D structure generated by the system of FIG. 1, in accordance with an embodiment of the present disclosure against Large Scale Direct (LSD) and rotated BRIEF (ORB) SLAM.
Figure 10A:
Figure 10B:
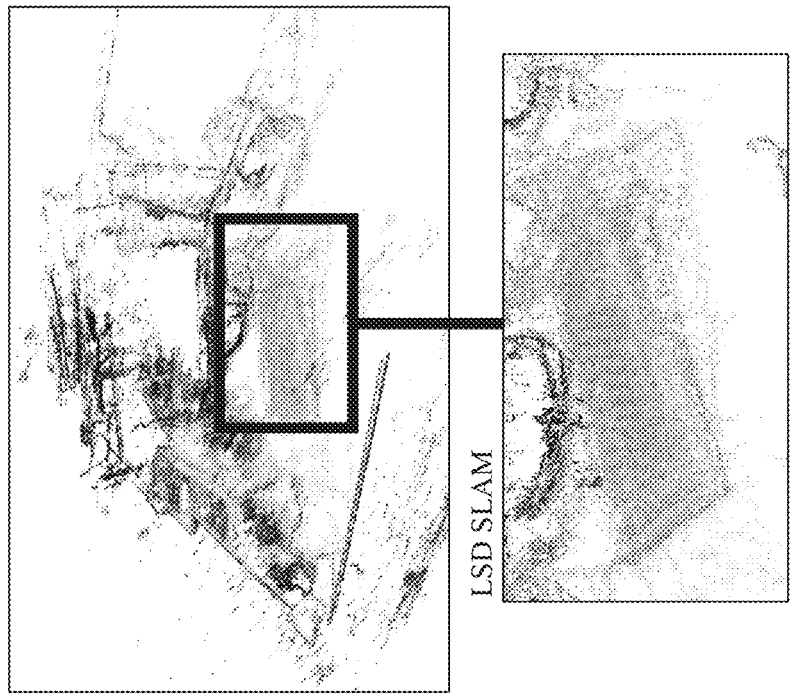
Figure 10B:
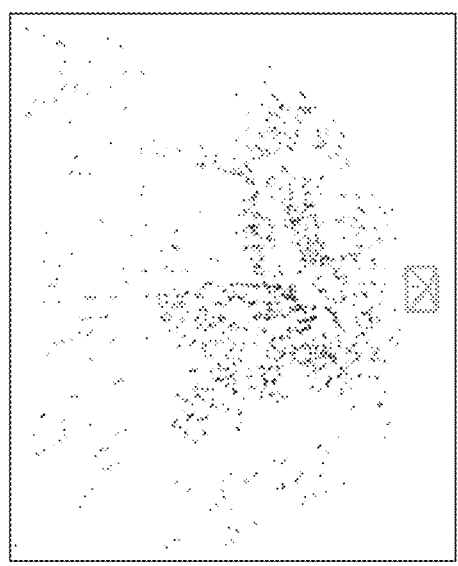

In addition to better camera localization, the pipeline of the present disclosure produces significantly improved structure compared with existing SLAMs. FIG. 10A and FIG. 10B illustrate a comparison of 3D structure generated by the system of FIG. 1, in accordance with an embodiment of the present disclosure against Large Scale Direct (LSD) and rotated BRIEF (ORB) SLAM. It is evident that the pipeline of the present disclosure produces superior quality structure against existing SLAM pipelines. A module wise time analysis is presented in Table 3 calculated on fr2_desk sequence.

TABLE 3

Method wise mean execution time on fr2_desk sequence.

| Method | Mean (ms) |
|---|---|
| Edge extraction | 13 |
| Correspondence generation | 7 |
| Keyframe selection | 14 |
| Pose estimation | 11 |
| Map generation | 5 |
| Local bundle adjustment (on 5 keyframes) | 175 |

The camera tracking of the present disclosure runs on 17 fps, whereas the mapping method runs on 4 fps using an un-optimized implementation, In accordance with the present disclosure, systems and methods of the present disclosure facilitate a visual SLAM pipeline with a focus on tracking in both textured as well as very low textured environments and building recognizable maps. The SLAM is first initialized through a validation process that provides better initialization compared with state-of-the-art visual SLAMS. A local optimization method is provided for stable camera estimation in situations where camera tracking becomes unreliable in a very low-textured challenging environment. The pipeline of the present disclosure is capable of reliable loop closing using structural properties of edges in the acquired frames.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein: such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method comprising:
acquiring successive frames, in real time, from multiple views captured by a monocular camera located in a simultaneous localization and mapping (SLAM) environment and characterized by multiple unknown poses;
detecting edges in each of the successive frames;
thinning the edges of each of the successive frames to obtain thinned edges having a single pixel width;
applying an edge filtering process on the thinned edges to eliminate noise therein;
estimating point feature correspondences of edge points constituting the thinned edges by tracking the edge points using an optical flow;
identifying a first frame as a keyframe and further identifying a plurality of keyframes, from the acquired successive frames, based on the estimated point feature correspondences and satisfying a first set of constraints;
performing a two-view initialization using a selected pair of keyframes from the plurality of keyframes satisfying a second set of constraints to obtain a validated 3D structure;
estimating a trajectory of estimated poses from the multiple unknown poses of the monocular camera by obtaining incremental poses based on the validated 3D structure constituting 3D structure points; and
rectifying drifts in the estimated trajectory captured in the multiple views using loop closure.

2. The processor implemented method of claim 1, wherein the step of detecting edges in each of the successive frames is based on a Difference of Gaussians (DoG) method.

3. The processor implemented method of claim 1, wherein the step of estimating point feature correspondences of the edge points is performed using a bi-directional sparse iterative and pyramidal version of the Lucas-Kanade optical flow on intensity images associated with the thinned edges.

4. The processor implemented method of claim 1, wherein the estimated point feature correspondences of the edge points are refined using epipolar geometry between three successive keyframes.

5. The processor implemented method of claim 1, wherein the first set of constraints include one or more of:
  pairwise rotation constraint between a current frame and a last identified keyframe of the plurality of keyframes from the acquired successive frames, the pairwise rotation being calculated using epipolar geometry, wherein if the rotation between the current frame and the last identified keyframe is more than 15°, consider a previous frame as a new keyframe;
  average number of tracked point feature correspondence constraint for each of the successive frames, wherein if number of 2D point feature correspondences between the current frame and the last identified keyframe falls below thirty percent of an average point feature correspondence, consider a previous frame as a new keyframe;
  number of 3D-2D point feature correspondences constraint, wherein if number of 3D-2D point feature correspondences reduces below 250, consider a next frame as a new keyframe;
  average positional change of point feature correspondences constraint, wherein if average positional change between the current frame and the last identified keyframe obtained by averaging Euclidean distance between previous and current pixel positions of all point feature correspondences, is more than twenty percent of width of an associated frame, consider the current frame as a new keyframe; and
consider a new keyframe in a fixed interval of 1 second.

6. The processor implemented method of claim 1, wherein the second set of constraints include one or more of:
  pairwise rotation between the selected pair of keyframes is more than 15°;
  averaging Euclidean distance between previous and current pixel positions of all point feature correspondences pertaining to the selected pair of keyframes exceed 20 percent of frame width; and
time difference of 1 second between the selected pair of keyframes.

7. The processor implemented method of claim 1, wherein the step of performing two-view initialization comprises:
  iteratively performing:
    estimating poses for an initial pair of keyframes from the acquired successive frames using a five-point method, wherein the poses correspond to the multiple unknown poses;
    generating an initial 3D structure comprising a set of 3D structure points by triangulation using the estimated poses;
    optimizing the initial 3D structure using global bundle adjustment, performed periodically on the initial pair of estimated poses and the initial 3D structure to obtain an optimized 3D structure;
    validating the optimized 3D structure by:
      calculating connectivity of edge points in the filtered thinned edges;
      determining spatial smoothness among 2D points in the initial pair of keyframes conforming to corresponding 3D structure points of the optimized 3D structure;
      identifying straight lines having same ordering of point feature correspondences in 2D and 3D using the calculated connectivity of edge points and based on a local neighborhood gradient;
      assigning a quality factor to the optimized 3D structure based on number of identified straight lines;
      comparing the assigned quality factor of the optimized 3D structure with an empirically defined threshold;
      identifying the optimized 3D structure as the validated 3D structure and the initial pair of keyframes as the selected pair of keyframes if the assigned quality factor is greater than the empirically defined threshold;
      iteratively checking the subsequent pairs of keyframes for identifying a pair of keyframes therein as the selected pair of keyframes, in the event that the assigned quality factor is less than the empirically defined threshold, wherein the selected pair of keyframes corresponds to a new 3D structure having the quality factor greater than the empirically defined threshold; and
identifying the new 3D structure corresponding to the selected pair of keyframes as the validated 3D structure.

8. The processor implemented method of claim 7, wherein the step of estimating the trajectory of estimated poses from the multiple unknown poses of the monocular camera by obtaining incremental poses using the validated 3D structure comprises:
  reconstructing the validated 3D structure by adding new 3D structure points based on triangulation of the point feature correspondences corresponding to each of the keyframes from the plurality of keyframes identified subsequent to the selected pair of keyframes;
  identifying co-visible keyframes from the plurality of keyframes, wherein the co-visible keyframes correspond to keyframes having more than 100 common visible 3D structure points;
  performing local bundle adjustment on the co-visible keyframes and the visible 3D structure points for optimizing the estimated poses of the monocular camera; and
  estimating the trajectory based on the optimized poses of the monocular camera.

9. The processor implemented method of claim 8 further comprising performing camera track loss recovery for continuous tracking of the monocular camera by:
  estimating relative poses between a last keyframe and a current keyframe, from the acquired successive frames, based on 2D-2D point feature correspondences in a homogeneous coordinate system having a scale and origin that differs from a SLAM coordinate system;
  triangulating new 3D structure points between the last keyframe and the current keyframe based on the estimated relative poses;
  estimating a second last keyframe by using the triangulated new 3D structure points; and
  transforming the estimated keyframe from the homogeneous coordinate system into the SLAM coordinate system.

10. The processor implemented method of claim 9, wherein the step of rectifying drifts in the estimated trajectory captured in the multiple views using loop closure comprises:
  performing loop detection for finding loops in the estimated trajectory by:
    checking a match between a pair of keyframes using third order moment invariants providing a first matching score and a quadrant based matching providing a second matching score, wherein the pair of keyframes constitute the current keyframe and each of the subsequent keyframes, and wherein the quadrant based matching comprises dividing each of the keyframes into 16 quadrants and calculating a matching score based on matched quadrants between a pair of the keyframes, wherein the matched quadrants are identified based on an adaptive weighted average of number of edges, average edge pixel density and average intensity in each of the 16 quadrants;

deriving a final matching score between the pair of keyframes by averaging the first matching score and the second matching score;

deriving a set of third matching scores between the current keyframe and a maximum of 5 immediate neighboring keyframes having less than 30 degree viewing direction change;

selecting a threshold, wherein the threshold is a lowest value of the set of third matching scores for the loop detection;

calculating a fourth matching score of non-neighboring keyframes in the plurality of keyframes and retaining the keyframes having the fourth matching score above the selected threshold;

identifying a keyframe as a matched keyframe for the loop with the current keyframe if a threshold constraint is satisfied, wherein the threshold constraint requires three consecutive keyframes having the fourth matching score more than the selected threshold;

calculating point feature correspondences between the current keyframe and the matched keyframe;

calculating a similarity transformation between the current keyframe and the matched keyframe using the calculated point feature correspondences to create a set of 3D-3D point correspondences therebetween; and selecting the matched keyframe as a loop keyframe of the current keyframe if the similarity transformation has number of inliers more than 100; and performing loop merging for correcting drifts in the estimation of the current keyframe and a subsequent keyframe by:

updating the multiple estimated poses of the monocular camera for the current keyframe and neighboring keyframes thereof using the calculated similarity transformation;

selecting a set of the 3D structure points visible to the matched keyframe and neighbors thereof and projecting the selected set of the 3D structure points to the current keyframe and neighbors thereof;

checking the 3D-2D correspondences between the projected 3D structure points and the visible 3D structure points to the current keyframe and neighbors thereof; and merging of the visible 3D structure points having 3D-2D correspondences and considered as inliers to the similarity transformation; and performing the global bundle adjustment on the plurality of keyframes constituting the loop and the 3D structure points therein.

11. A system comprising:

one or more data storage devices operatively coupled to one or more hardware processors and configured to store instructions configured for execution by the one or more hardware processors to:

acquire successive frames, in real time, from multiple views captured by a monocular camera located in a simultaneous localization and mapping (SLAM) environment and characterized by multiple unknown poses;

detect edges in each of the successive frames;

thin the edges of each of the successive frames to obtain thinned edges having a single pixel width;

apply an edge filtering process on the thinned edges to eliminate noise therein;

estimate point feature correspondences of edge points constituting the thinned edges by tracking the edge points using an optical flow;

identify a first frame as a keyframe and further identifying a plurality of keyframes, from the acquired successive frames, based on the estimated point feature correspondences and satisfying a first set of constraints;

perform a two-view initialization using a selected pair of keyframes from the plurality of keyframes satisfying a second set of constraints to obtain a validated 3D structure;

estimate a trajectory of estimated poses from the multiple unknown poses of the monocular camera by obtaining incremental poses based on the validated 3D structure constituting 3D structure points; and rectify drifts in the estimated trajectory captured in the multiple views using loop closure.

12. The system of claim 11, wherein the first set of constraints include one or more of:

pairwise rotation constraint between a current frame and a last identified keyframe from the acquired successive frames, the pairwise rotation being calculated using epipolar geometry, wherein if the rotation between the current frame and the last identified keyframe is more than 15°, consider a previous frame as a new keyframe;

average number of tracked point feature correspondence constraint for each of the successive frames, wherein if number of 2D point feature correspondences between the current frame and the last identified keyframe falls below thirty percent of an average point feature correspondence, consider a previous frame as a new keyframe;

number of 3D-2D point feature correspondences constraint, wherein if number of 3D-2D point feature correspondences reduces below 250, consider a next frame as a new keyframe;

average positional change of point feature correspondences constraint, wherein if average positional change between the current frame and the last identified keyframe obtained by averaging Euclidean distance between previous and current pixel positions of all point feature correspondences, is more than twenty percent of width of an associated frame, consider the current frame as a new keyframe; and consider a new keyframe in a fixed interval of 1 second.

13. The system of claim 11, wherein the second set of constraints include one or more of:

pairwise rotation between the selected pair of keyframes is more than 15°;

averaging Euclidean distance between previous and current pixel positions of all point feature correspondences pertaining to the selected pair of keyframes exceed 20 percent of frame width; and time difference of 1 second between the selected pair of keyframes.

14. The system of claim 11, wherein the one or more hardware processors are further configured to perform two-view initialization by:

iteratively performing:
  estimating poses for an initial pair of keyframes from the acquired successive frames using a five-point method, wherein the poses correspond to the multiple unknown poses;
  generating an initial 3D structure comprising a set of 3D structure points by triangulation using the estimated poses;
  optimizing the initial 3D structure using global bundle adjustment, performed periodically on the initial pair of estimated poses and the initial 3D structure;
  validating the optimized 3D structure by:
    calculating connectivity of edge points in the filtered thinned edges;
    determining spatial smoothness among 2D points in the initial pair of keyframes conforming to corresponding 3D structure points of the optimized 3D structure;
    identifying straight lines having same ordering of point feature correspondences in 2D and 3D using the calculated connectivity of edge points and based on a local neighborhood gradient;
    assigning a quality factor to the optimized 3D structure based on number of identified straight lines;
    comparing the assigned quality factor of the optimized 3D structure with an empirically defined threshold;
    identifying the optimized 3D structure as the validated 3D structure and the initial pair of keyframes as the selected pair of keyframes if the assigned quality factor is greater than the empirically defined threshold;
    iteratively checking the subsequent pairs of keyframes for identifying a pair of keyframes therein as the selected pair of keyframes, in the event that the assigned quality factor is less than the empirically defined threshold, wherein the selected pair of keyframes corresponds to a new 3D structure having the quality factor greater than the empirically defined threshold; and
    identifying the new 3D structure corresponding to the selected pair of keyframes as the validated 3D structure.

15. The system of claim 14, wherein the one or more hardware processors are further configured to estimate a trajectory of estimated poses from the multiple unknown poses of the monocular camera by obtaining incremental poses using the validated 3D structure by:
  reconstructing the validated 3D structure by adding new 3D structure points based on triangulation of the point feature correspondences corresponding to each of the keyframes from the plurality of keyframes identified subsequent to the selected pair of keyframes;
  identifying co-visible keyframes from the plurality of keyframes, wherein the co-visible keyframes correspond to keyframes having more than 100 common visible 3D structure points;
  performing local bundle adjustment on the co-visible keyframes and the visible 3D structure points for optimizing the estimated poses of the monocular camera; and
estimating the trajectory based on the optimized poses of the monocular camera.

16. The system of claim 15, wherein the one or more hardware processors are further configured to perform camera track loss recovery for continuous tracking of the monocular camera by:
  estimating relative poses between a last keyframe and a current keyframe, from the acquired successive frames, based on 2D-2D point feature correspondences in a homogeneous coordinate system having a scale and origin that differs from a SLAM coordinate system;
  triangulating new 3D structure points between the last keyframe and the current keyframe based on the estimated relative poses;
  estimating a second last keyframe by using the triangulated new 3D structure points; and
  transforming the estimated keyframe from the homogeneous coordinate system into the SLAM coordinate system.

17. The system of claim 16, wherein the one or more hardware processors are further configured to rectify drifts in the estimated trajectory captured in the multiple views using loop closure by:
  performing loop detection for finding loops in the estimated trajectory by:
    checking a match between a pair of keyframes using third order moment invariants providing a first matching score and a quadrant based matching providing a second matching score, wherein the pair of keyframes constitute the current keyframe and each of the subsequent keyframes, and wherein the quadrant based matching comprises dividing each of the keyframes into 16 quadrants and calculating a matching score based on matched quadrants between a pair of the keyframes, wherein the matched quadrants are identified based on an adaptive weighted average of number of edges, average edge pixel density and average intensity in each of the 16 quadrants;
    deriving a final matching score between the pair of keyframes by averaging the first matching score and the second matching score;
    deriving a set of third matching scores between the current keyframe and a maximum of 5 immediate neighboring keyframes having less than 30 degree viewing direction change;
    selecting a threshold, wherein the threshold is a lowest value of the set of third matching scores for the loop detection;
    calculating a fourth matching score of non-neighboring keyframes in the plurality of keyframes and retaining the keyframes having the fourth matching score above the selected threshold;
    identifying a keyframe as a matched keyframe for the loop with the current keyframe if a threshold constraint is satisfied, wherein the threshold constraint requires three consecutive keyframes having the fourth matching score more than the selected threshold;
    calculating point feature correspondences between the current keyframe and the matched keyframe;
    calculating a similarity transformation between the current keyframe and the matched keyframe using the calculated point feature correspondences to create a set of 3D-3D point correspondences therebetween; and
    selecting the matched keyframe as a loop keyframe of the current keyframe if the similarity transformation has number of inliers more than 100; and
  performing loop merging for correcting drifts in the estimation of the current keyframe and a subsequent keyframe by:

updating the multiple estimated poses of the monocular camera for the current keyframe and neighboring keyframes thereof using the calculated similarity transformation;

selecting a set of the 3D structure points visible to the matched keyframe and neighbors thereof and projecting the selected set of the 3D structure points to the current keyframe and neighbors thereof;

checking the 3D-2D correspondences between the projected 3D structure points and the visible 3D structure points to the current keyframe and neighbors thereof; and merging of the visible 3D structure points having 3D-2D correspondences and considered as inliers to the similarity transformation; and performing the global bundle adjustment on the plurality of keyframes constituting the loop and the 3D structure points therein.

18. A computer program product comprising a non-transitory computer readable medium having a computer readable program embodied therein, wherein the computer readable program, when executed on a computing device, causes the computing device to:

acquire successive frames, in real time, from multiple views captured by a monocular camera located in a simultaneous localization and mapping (SLAM) environment and characterized by multiple unknown poses;

detect edges in each of the successive frames;

thin the edges of each of the successive frames to obtain thinned edges having a single pixel width;

apply an edge filtering process on the thinned edges to eliminate noise therein;

estimate point feature correspondences of edge points constituting the thinned edges by tracking the edge points using an optical flow;

identify a first frame as a keyframe and further identifying a plurality of keyframes, from the acquired successive frames, based on the estimated point feature correspondences and satisfying a first set of constraints;

perform a two-view initialization using a selected pair of keyframes from the plurality of keyframes satisfying a second set of constraints to obtain a validated 3D structure;

estimate a trajectory of estimated poses from the multiple unknown poses of the monocular camera by obtaining incremental poses based on the validated 3D structure constituting 3D structure points; and rectifying drifts in the estimated trajectory captured in the multiple views using loop closure; and perform camera track loss recovery for continuous tracking of the monocular camera.

\* \* \* \* \*